United States Patent [19]
Culwell

[11] Patent Number: 6,152,980
[45] Date of Patent: Nov. 28, 2000

[54] SIZE ADJUSTABLE FILTER ELEMENT

[76] Inventor: C William Culwell, P.O. Box 870, Goodlettsville, Tenn. 37072

[21] Appl. No.: 09/270,494

[22] Filed: Mar. 15, 1999

[51] Int. Cl.[7] .................................................. B01D 29/07
[52] U.S. Cl. ............................... 55/481; 55/491; 55/496; 55/499; 55/501; 55/524
[58] Field of Search ............................... 55/501, 499, 497, 55/511, 496, 491, 506, 524, 481

[56] References Cited

U.S. PATENT DOCUMENTS

| | | | |
|---|---|---|---|
| 2,071,806 | 2/1937 | Walker | 55/499 |
| 2,479,722 | 8/1949 | Brixius | 55/499 |
| 3,430,771 | 3/1969 | Dreher | 55/501 |
| 3,853,529 | 12/1974 | Boothe et al. | 55/499 |

*Primary Examiner*—Duane Smith
*Assistant Examiner*—Robert A. Hopkins
*Attorney, Agent, or Firm*—Michael I. Kroll

[57] ABSTRACT

The present invention 10 discloses an air filter element 18 that is partially fabricated on site wherein one or more wire frames 28 are fastened to one another using a high tensile strength adhesive tape 34 to form a structure substantially conforming to the dimensions of the original equipment manufacturers' filter housings 20. The filter media 18 is attached to the rigid wire frame 28 by selectively drawing pleats 24 around a portion of a wire member 28 and securing the pleats to each other by means of epoxy coated staples 36 thereby securing the filter media 18 to the wire frame 28. Whereupon the on-site partially fabricated filter element 18 can be inserted into the channels 30 of the appropriate original equipment manufacturers filter housing 20 wherein the skirt 38 of the on-site fabricated filter element will fill and conform to the filter housing channel 30 providing an air-seal thus forcing all airflow through the air filter 18.

14 Claims, 9 Drawing Sheets

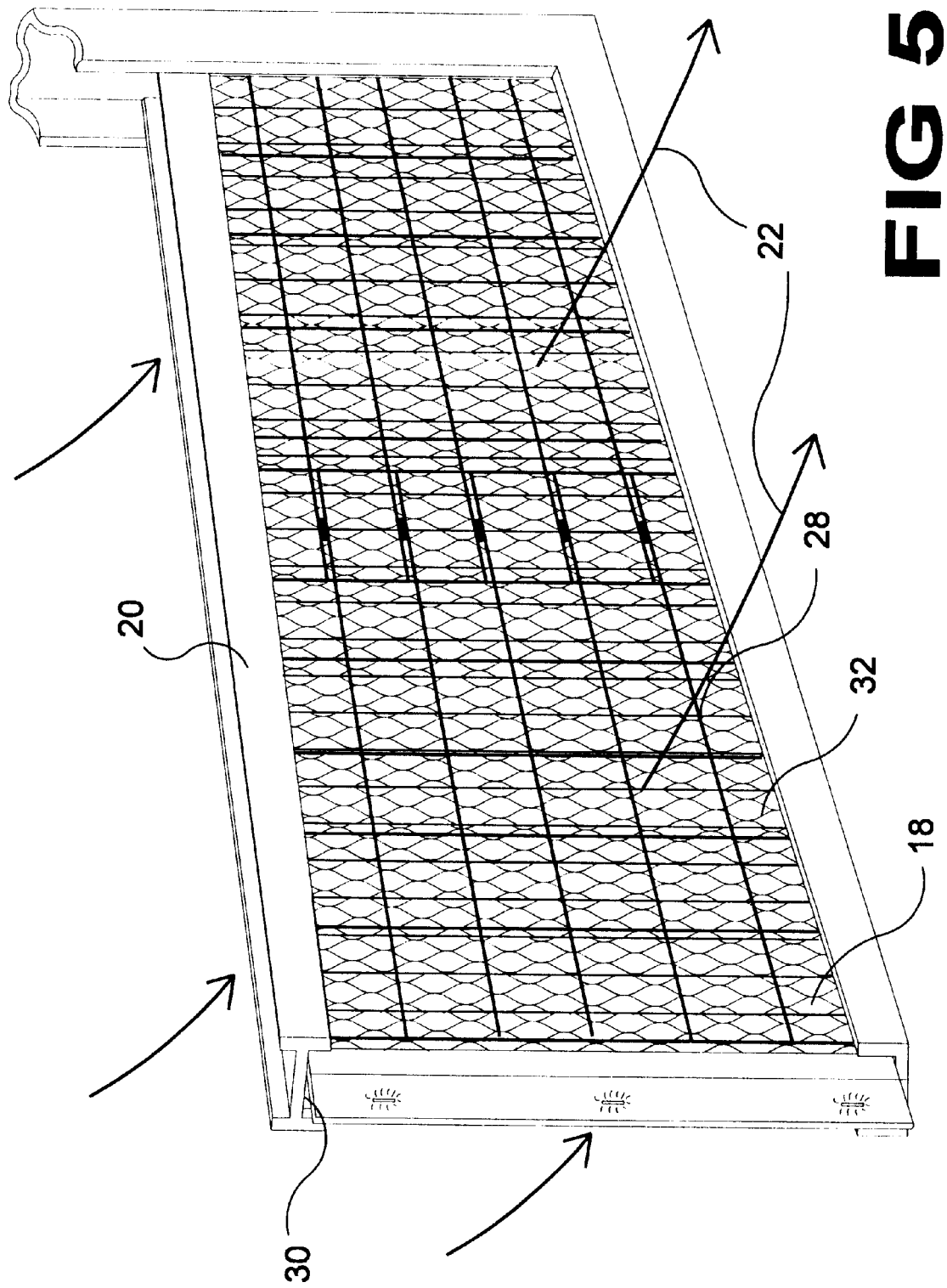

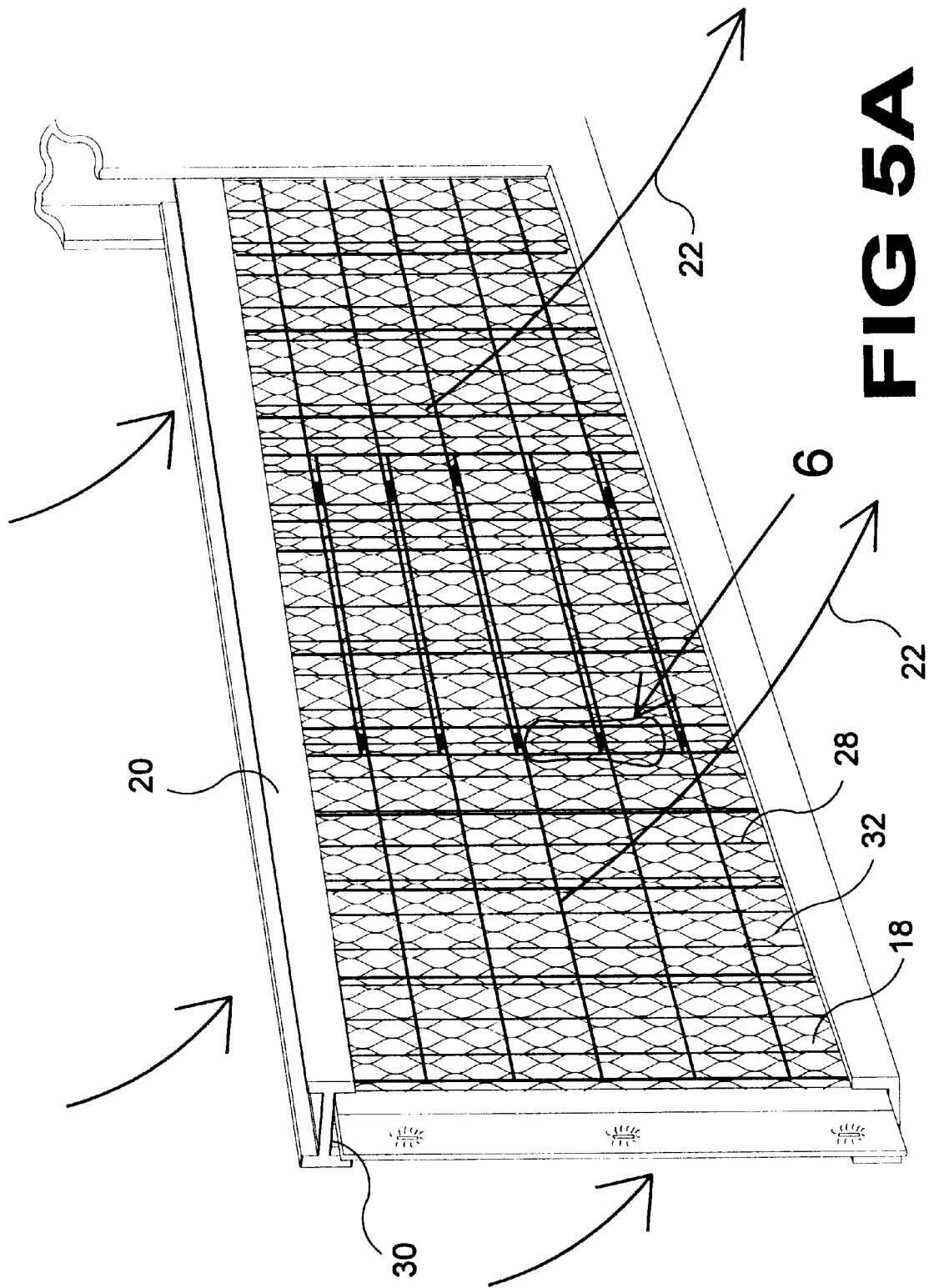

SIZE ADJUSTABLE FILTER ELEMENT

BACKGROUND OF THE INVENTION

1. Field of the Invention

The present invention relates generally to heating ventilating and air conditioning systems and, more specifically, to a size adjustable filter element being partially fabricated on site wherein one or more rigid wire frames are fastened to one another using a high tensile strength adhesive tape to form a structure substantially conforming to the units original equipment manufacturers filter housing.

The filter media consists of a mixture of natural and synthetic fibers and is bonded to a thin wire mesh backing leaving an amount of filter media on the top and bottom that extends beyond said wire mesh. Said wire mesh provides rigidity, which enables the filter media to be pleated and to keep said formed pleating over the life of the fabricated filter element. Said filter media is attached to the rigid wire frame by selectively drawing a portion of a pleat around each side of a wire member and securing said pleats to each other by means of epoxy coated staples, being rust resistant, thereby securing said filter media to said rigid wire frame.

When the filter media has been attached to the rigid wire frames, having been adjusted to conform to the existing filter element housing, the on-site fabricated filter element comprised of a fabric-like material attached to a rigid wire frame having a skirt of filter media, having no thin wire backing, extending beyond said rigid wire frame on two sides can be slid into the appropriate original equipment manufacturers filter housing wherein the skirt of said on-site fabricated filter will fill and conform to said filter housing.

2. Description of the Prior Art

There are numerous means for removing particle matter from atmospheric air before introducing said air into a heating, venting and/or air conditioning system. Usually these systems have one or more removable and replaceable rigid filter elements which are manufactured to a specific length and height and being inserted into a channeled filter housing to effectively seal the unit from the introduction of dust, dirt, and pollen.

Over time the filter element will be periodically replaced due to the build up of contaminants on the filter media which requires the technician to purchase a filter element from the original equipment manufacturer or some third party supplier whose sole business is manufacturing generic filter elements.

This system leaves the technician with little choice but to stock every conceivable filter element and to carry them around from job site to job site or order the replacement filter element and schedule a second on-site maintenance call to install the element when it arrives.

Additionally, the replaceable rigid filter elements allow significant contaminated, un-cleaned airflow to circulate around the replaceable rigid filter elements due to variations in tolerances of the replaceable rigid filter elements and the original equipment manufacturers' channeled filter housing. This bypass forces the technician to mechanically clean the original equipment manufacturers' air conditioning system and the attached ductwork and air distribution registers much more frequently than necessary if a proper air seal integrity were achievable and is detrimental to the mechanical and thermodynamic efficiency of the original equipment manufacturer's air conditioning system.

Further, the standard practice of employing cardboard superstructure to give rigidity to the prior art replaceable filter element causes the rigidity to deteriorate during high humidity conditions or rainstorms thus producing situations in which the replaceable rigid filter element is drawn out of the original equipment manufacturers' air conditioning system channeled filter housing and into the air moving fan destroying the replaceable rigid filter element's ability to filter at all. The use of this cardboard superstructure also blinds a portion of the replaceable rigid filter element and reduces the capacity of the element to capture and retain particulate matter. Finally, the use of this cardboard superstructure demands the use of wood fiber and is not environmentally conservative.

Not only does this cost the service technician by having to visit the same site twice, and having to perform certain functions twice, and the inconvenience to the client, having to shut the system down again, there is also the case of being unable to find or order the filter cartridge due to the age of the equipment thereby requiring the installation of an almost fits filter cartridge which further stresses an aged system that will require more frequent maintenance visits, requiring more time to remove the inevitable buildup of dirt and debris from within the system that is entering from around the edges of an ill fitting filter cartridge, as well as, lost customers who can't or won't understand why their system performance is so poor and feels that their service bureau is more interested in selling them a new system rather than maintaining the one they have.

Therefore, it is felt that the need exists to provide the technician with the ability to fabricate the needed filter element on-site, on an as-needed basis and in a custom size providing a positive seal, eliminating the reliance on cardboard for rigidity all of which will reduce system maintenance, improve equipment performance, foster good customer relations, and assist in conserving valuable forest resources.

SUMMARY OF THE PRESENT INVENTION

The present invention overcomes the shortcomings of the prior art by providing a filter element that is partially fabricated on site wherein one or more wire frames are fastened to one another using a high tensile strength adhesive tape to form a structure substantially conforming to the dimensions of the original equipment manufacturers' filter housings.

The filter media is attached to the rigid wire frame by selectively drawing pleats around a portion of a wire member and securing said pleats to each other by means of epoxy coated staples thereby securing said filter media to said wire frame. Whereupon the on-site partially fabricated filter element can be inserted into the appropriate original equipment manufacturers filter housing wherein the skirt of said on-site fabricated filter element will fill and conform to said filter housing, providing an air-seal thus forcing all air-flow through the filter element and eliminating the tendency of air-flow around, and thus bypassing, the element, thereby eliminating the need for unnecessary cleaning of the system and increasing mechanical and thermodynamic efficiency of the original equipment manufacturer's system.

Further, eliminating the superstructure of the filter element will increase the functional filter media surface area, thereby increasing the life expectancy of the filter assembly and decreasing maintenance costs.

A primary object of the present invention is to provide an on-site fabrication of a heating, ventilating, and/or air conditioning filter element.

Another object of the present invention is to provide a filter element which will conform to the original equipment manufacturers filter housing.

A further object of the present invention is to provide a filter element having a rigid wire frame having a number of wire frame members which are be affixed to one another to conform to an existing filter housing.

A still further object of the present invention is to provide a filter media being sufficiently rigid to form and hold pleating over the life of the filter element.

Another object of the present invention is to provide a filter media being sufficiently rigid which can be semi-permanently attached to the wire frame backing using epoxy coated staples providing a corrosive resistant means of attachment.

A further object of the present invention is to provide a filter element having reusable components. The filter media is detached from the wire frame on site and discarded and a new filter media is attached to the wire frame and reinstalled into the filter housing.

Additional objects of the present invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views.

FIG. 5 is a rear view of the filter element, taken from FIG. 2 as indicated, showing the on-site fabricated filter of the present invention installed into a typical original equipment manufacturers filter housing. Also shown, by arrows, is the direction of air flow.

FIG. 5A is a variation of a filter element showing the on-site fabricated filter element of the present invention installed into a typical original equipment manufacturers filter housing having a larger rigid wire frame backing, so as to be custom fitted to a filter housing, having a plurality of securement points between the rigid wire frame members. Also shown, by arrows, is the direction of air flow.

LIST OF REFERENCE NUMERALS

Figure 1:
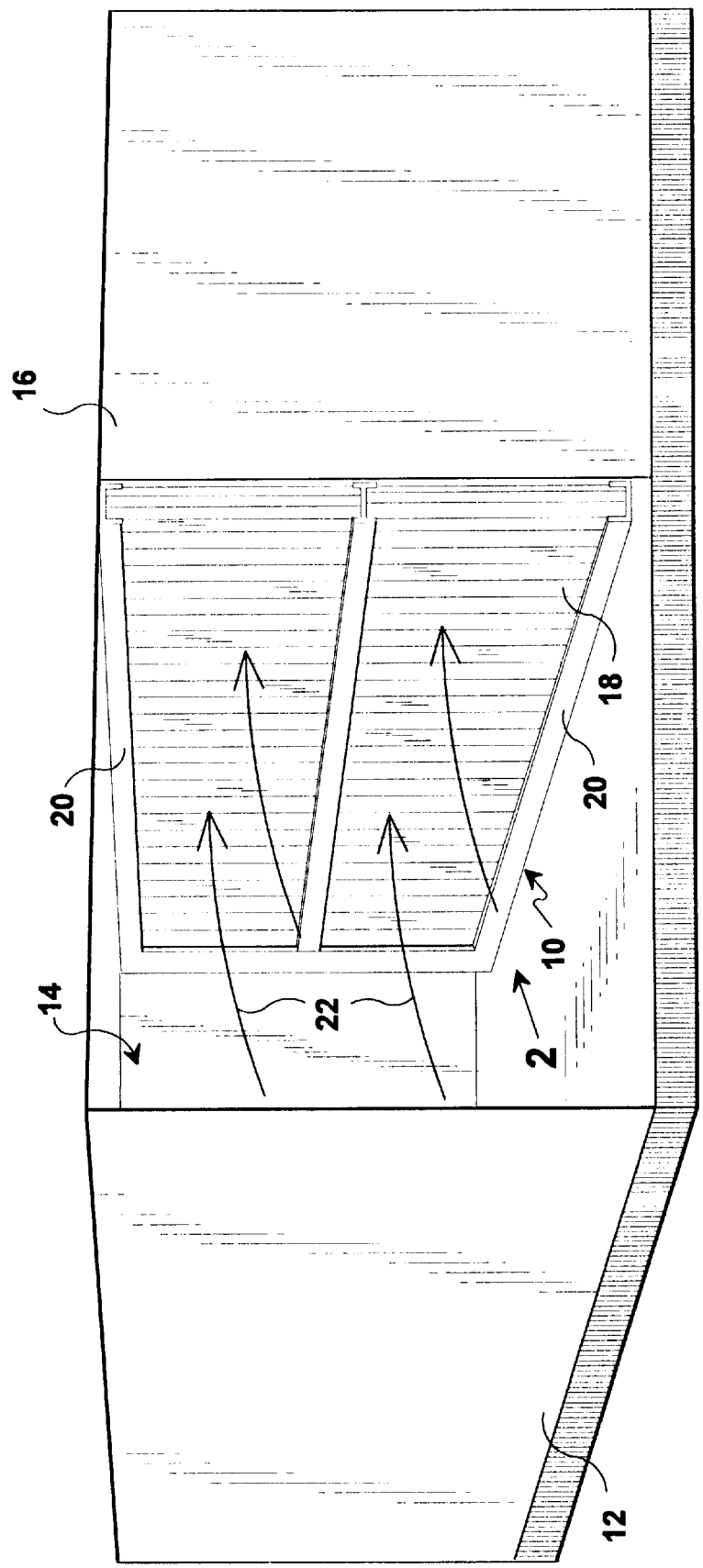
FIG. 1 is a perspective view of a typical commercial air conditioning unit having an access panel removed showing the present invention, being an on-site fabricated filter element, installed into both of the original equipment manufacturers filter housings. Also shown by arrows is the direction of air flow.

With regard to the reference numerals used, the following numbering is used throughout the drawings:

10 present invention
12 air conditioning unit
14 area for access panel
16 housing
18 filter
20 filter housing
22 arrows
24 pleated area
26 non-pleated area
28 wire frame member
30 housing channels
32 wire mesh
34 means for attachment
36 means for attachment
38 skirt

DESCRIPTION OF THE PREFERRED EMBODIMENT(S)

Turning now descriptively to the drawings, in which similar reference characters denote similar elements throughout the several views, FIGS. 1 through 7A illustrate the present invention being an adjustable filter element for air conditioners.

Turning to FIG. 1, therein is shown a perspective view of a typical commercial air conditioning unit 12 having an access panel 14 removed from its housing 16 showing the present invention 10 which is an onsite fabricated filter element 18 installed into both of the original equipment manufacturers filter housings 20. Filter element 18 comprises a mixture of natural and synthetic fibers. Also shown therein by arrows 22 is the direction of air flow. Note that the air filter housing 20 forms a frame around the perimeter of the generally vertically standing filter 18 so that the filter 18 is contained and secured within the housing 20.

Figure 2:
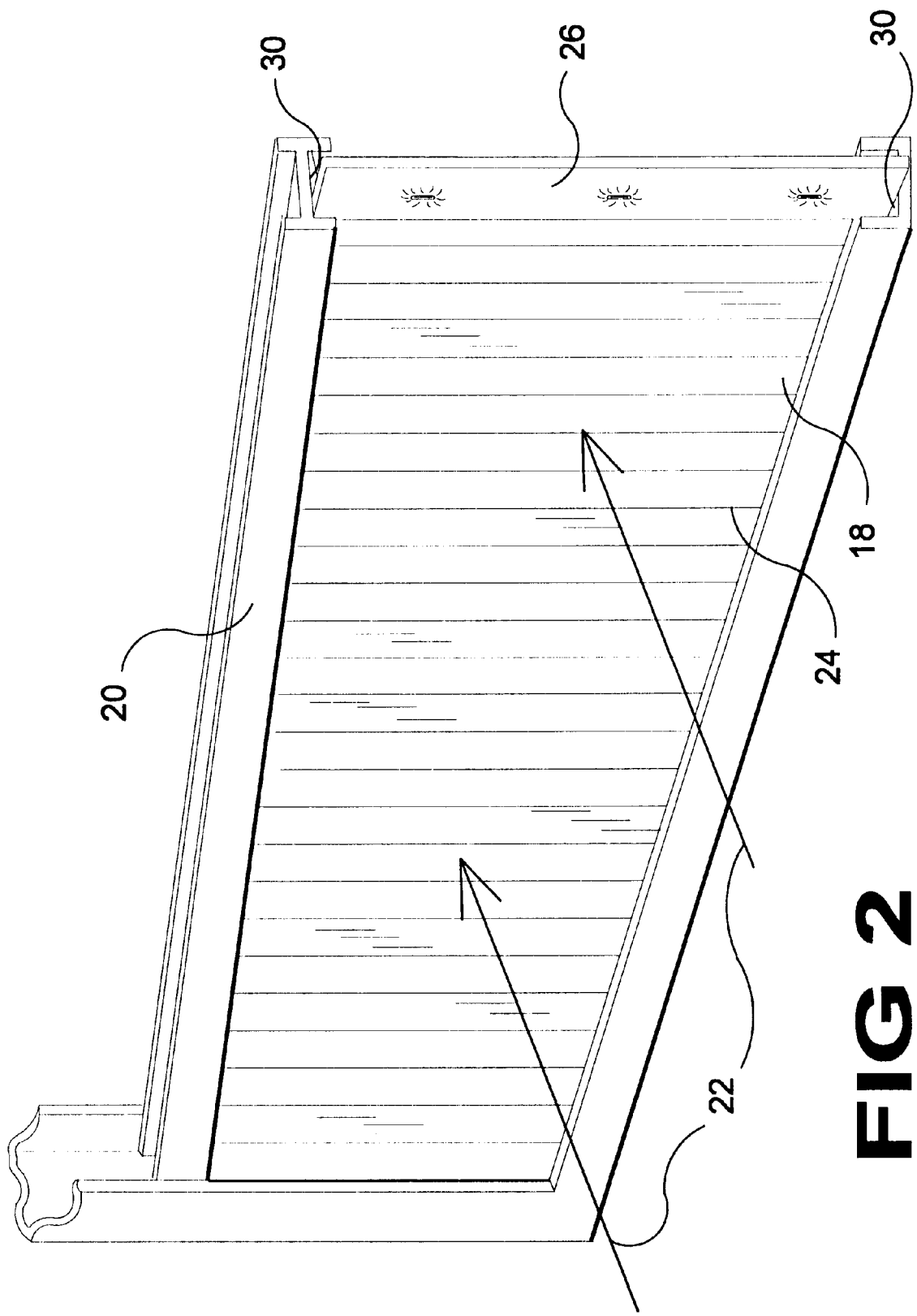
FIG. 2 is an enlarged view, taken from FIG. 1 as indicated, of the original equipment manufacturers filter housing having the on-site fabricated filter of the present invention installed therein. Also shown by arrows is the direction of air flow.

Turning to FIG. 2, therein is shown an enlarged view, taken from FIG. 1 as indicated, of the original equipment manufacturers filter housing 20 having the onsite fabricated filter 18 of the present invention 10 installed therein. Also shown by arrows 22 is the direction of air flow. Note that the filter 18 has a pleated portion 24 and a non-pleated portion 26.

Figure 3:
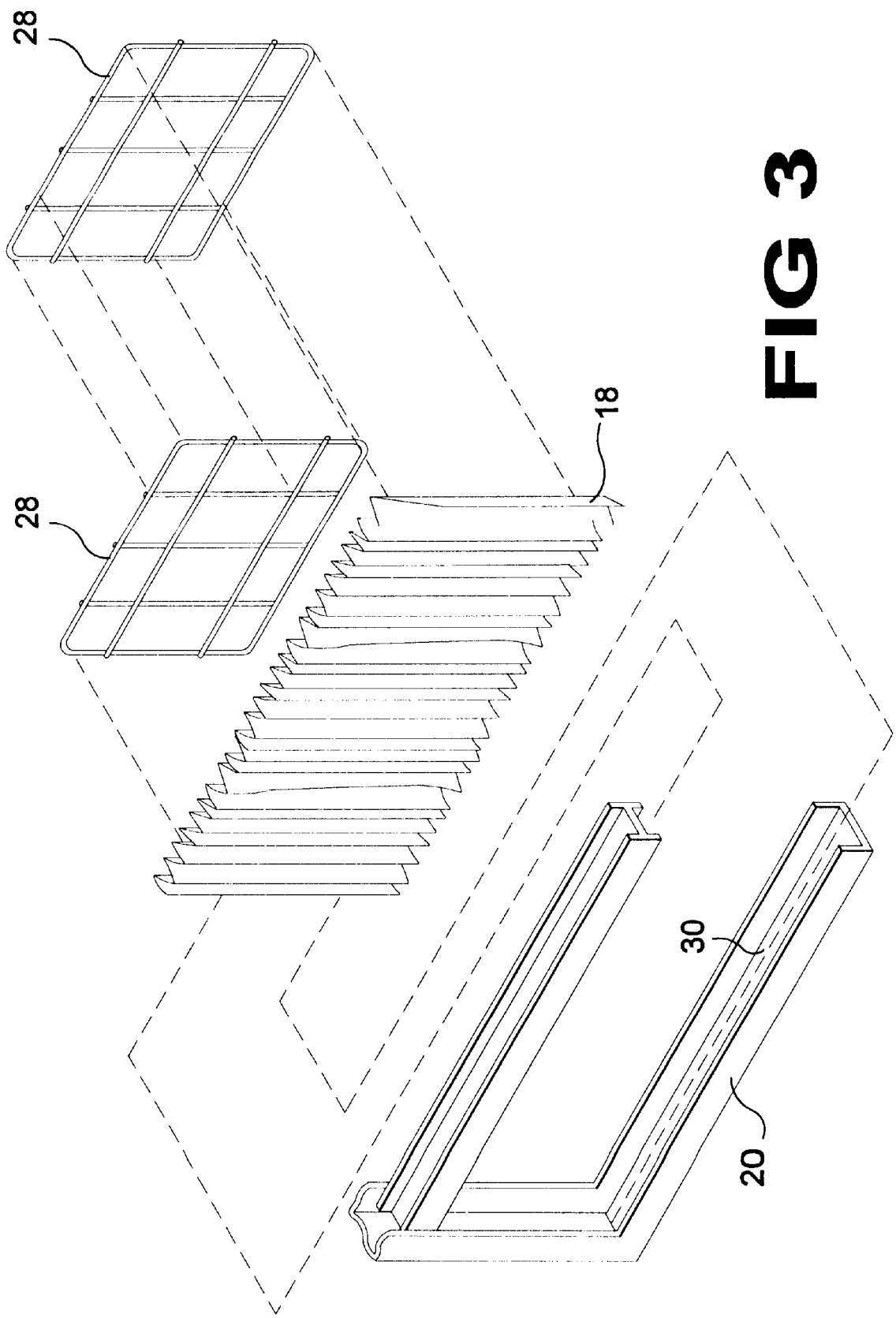
FIG. 3 is an exploded view of the rigid frame members that will be sized to conform to the filter housing and the filter media of the present invention. Also shown is a typical air conditioning filter housing.

Turning to FIG. 3, therein is shown an exploded view of the rigid wire frame members 28 having vertical and horizontal structural support members which will be custom sized onsite to conform to a filter housing 20 and the filter media 18 of the present invention. Note that the dotted guidelines of FIG. 3 indicate how the wire frame member 28 is placed on to the rear side of a filter 18 and thereafter filter 18 is slidably mounted into the channels 30 formed into the horizontal members of the filter housing 20 and the filter 18 is thereby held with in the filter housing 20 within the side loading channels 30.

Figure 4:
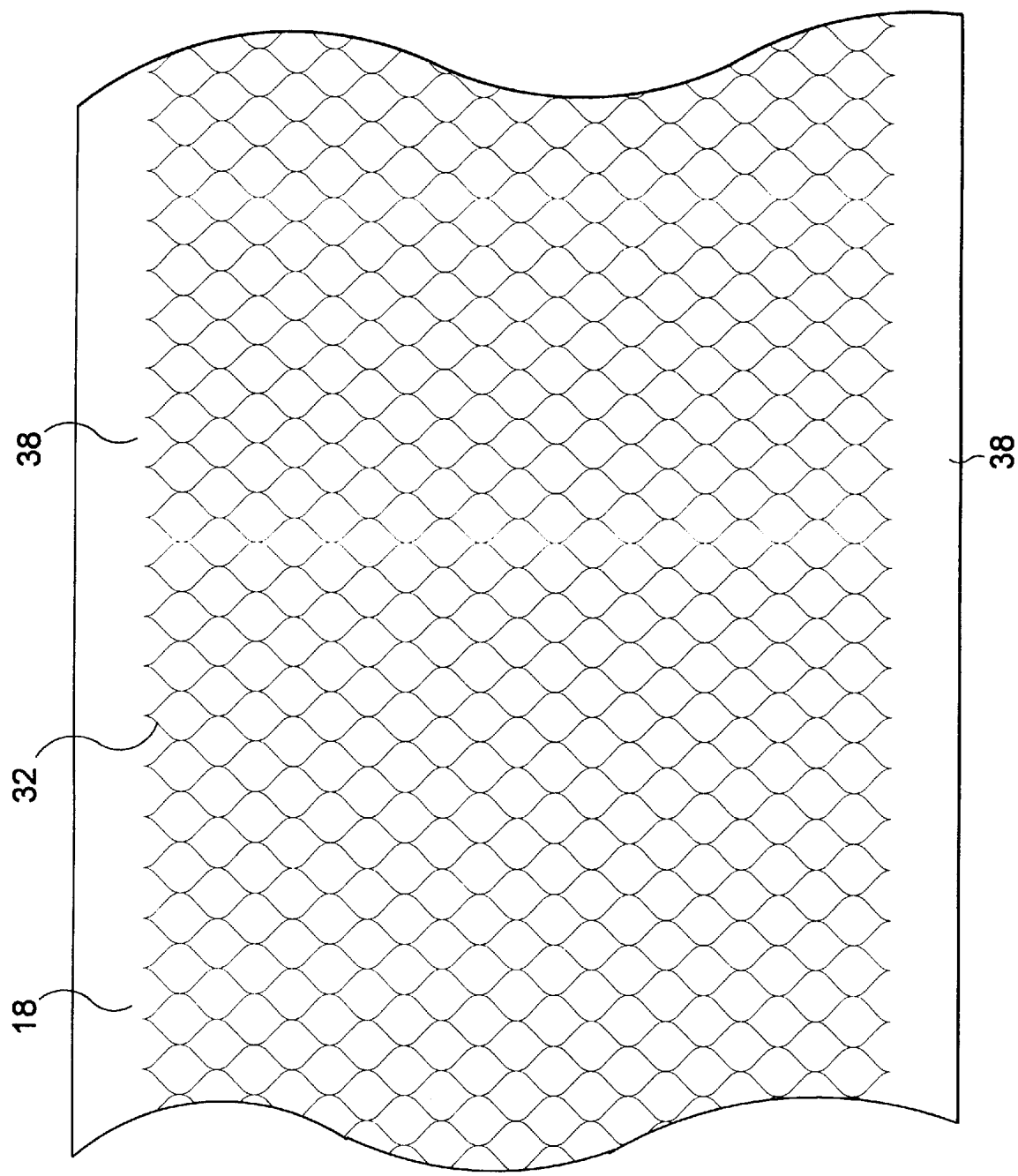
FIG. 4 is a rear view of the filter media of the present invention showing a fabric-like material, being the filter media, having a thin wire mesh backing providing means for holding the pleating of said material for the life of the filter media.

Turn to FIG. 4, therein is shown a rear view of the filter media 18 of the present invention showing a fabric like material, being the filter media 18, having a thin wire mesh backing 32 bonded thereto leaving an amount of filter media on the top edge and bottom edge of the filter 18 which extends beyond the wire mesh 32 referred to herein as the selvage or skirt 38. The wire mesh 32 provides means for securing and holding the pleated portion of said filter material for the life of the filter media 18. The skirt can slide into and will fill, form a gasket within and conform to the channels 30 of the filter housing 20 thereby forming an air seal thus forcing all airflow through the filter element 18. This air seal increases the efficiency of the air conditioning unit.

Turning to FIG. 5, therein is shown a rear view of the filter element 18, taken from FIG. 2 as indicated, showing the onsite fabricated filter 18 of the present invention installed into a typical original equipment manufacturers filter housing 20. Also shown by arrows 22 is the direction of air flow. Also shown therein is the wire frame members 28 mounted generally vertically and contiguous thereto along with the wire mesh member 32.

Turning to FIG. 5A, therein is shown a variation of a filter element showing the onsite fabricated filter element 18 of the present invention installed into a typical original equipment manufacturers filter housing 20 having a larger rigid wire frame backing 28 so as to be custom fitted to the filter housing 20 having a plurality of securement points 34 or means for attachment between the rigid wire frame members 28. Also shown is the wire mesh 32 along with arrows 22 showing the direction of air flow.

Figure 6:
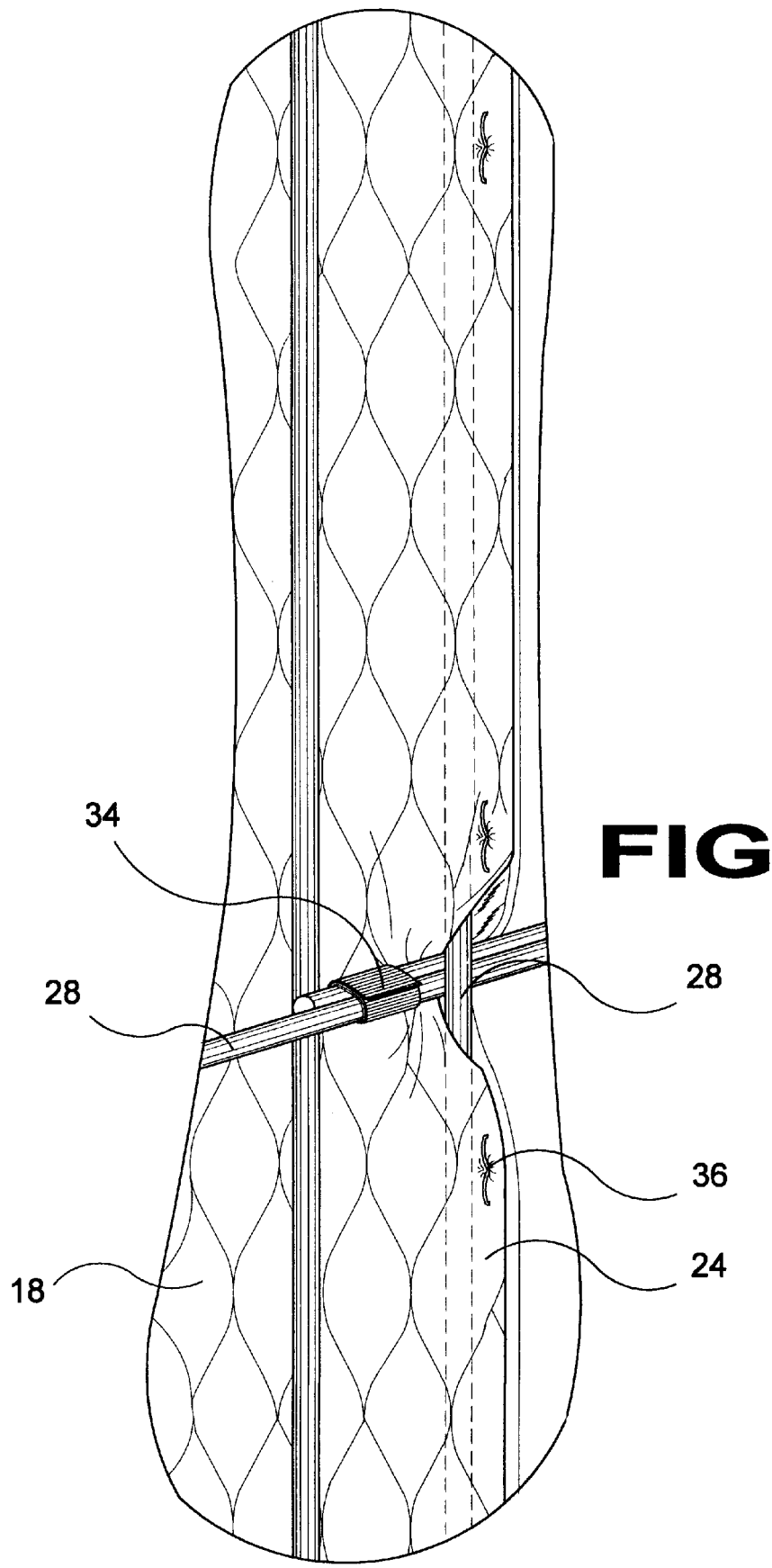
FIG. 6 is an exploded view, taken from FIG. 5A as indicated, showing the means of attachment of the filter media to the rigid wire frame, shown are pleats partially drawn around a section of the rigid wire frame whereupon said pleats are fastened to one another by means of epoxy coated staples. Also shown is one means for securing the rigid wire frames together using a length of a special adhesive tape.

Turning to FIG. 6, therein is shown an exploded view, taken from FIG. 5A as indicated, showing the means for attachment 36 of the filter media 18 to the rigid wire frame members 28 wherein are shown pleats 24 partially drawn around a section of a rigid wire frame member 28 whereupon said pleats 24 are fastened to one another by means for fastening 36, e.g.., epoxy coated staples which resist rusting, clips or the like in the standard manner by one skilled in the art. Also shown is one means for securing 34 the rigid wire frame members together, e.g., having a length of special adhesive tape wrapped around the rigid wire frame member 28 so as to secure the frame members 28 so as to be contiguous to each other. Other means for securing 34 could be string, wire, clips, self-locking plastic ties or the like in the standard manner by one skilled in the art.

Figure 7:
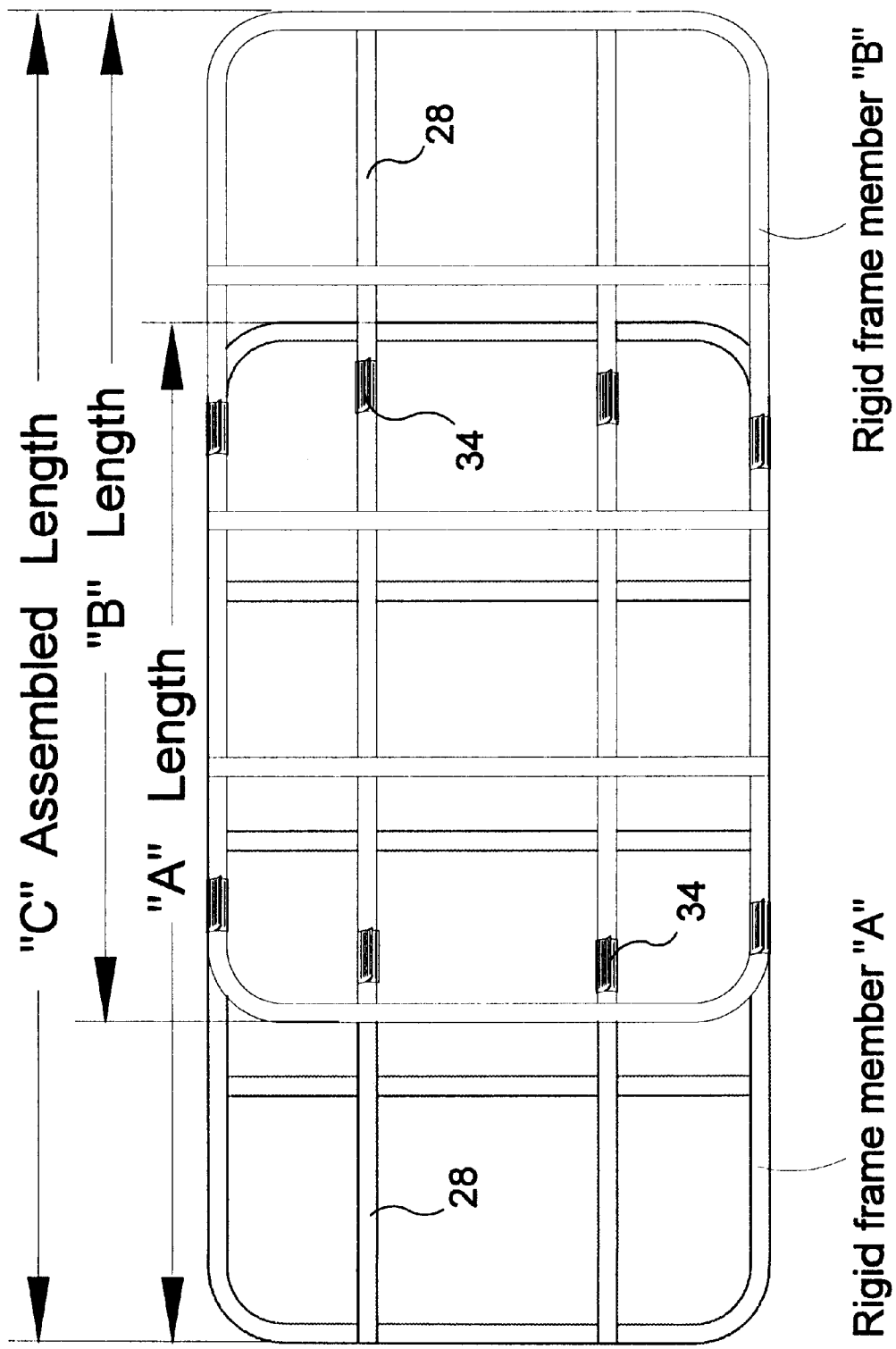
FIG. 7 is a diagrammatic illustration showing how two prefabricated rigid wire members, having been transported to a job site, are selected as the appropriate vertical size and are positioned to the appropriate horizontal size before being secured to one another by means of a special adhesive tape. Whereupon the filter media will be affixed to said frame by means of a plurality of epoxy coated staples. "C" length is accomplished by the assembly of rigid frame member "A" to rigid frame member "B".

Turning to FIG. 7, therein is shown a diagrammatic illustration showing how two prefabricated rigid wire members 28, having been transported to a job site, are selected as the appropriate vertical size and are positioned to the appropriate horizontal size to be fit into the housing 20 (not shown) before being secured to one another by means of a special adhesive tape 34. Whereupon the filter media 18 (not shown) will be affixed to said frame 28 by means of a plurality of epoxy coated staples (not shown) as shown in FIG. 6. "C" length is accomplished by the appropriate assembly of rigid frame member "A" to rigid frame member "B".

Figure 7A:
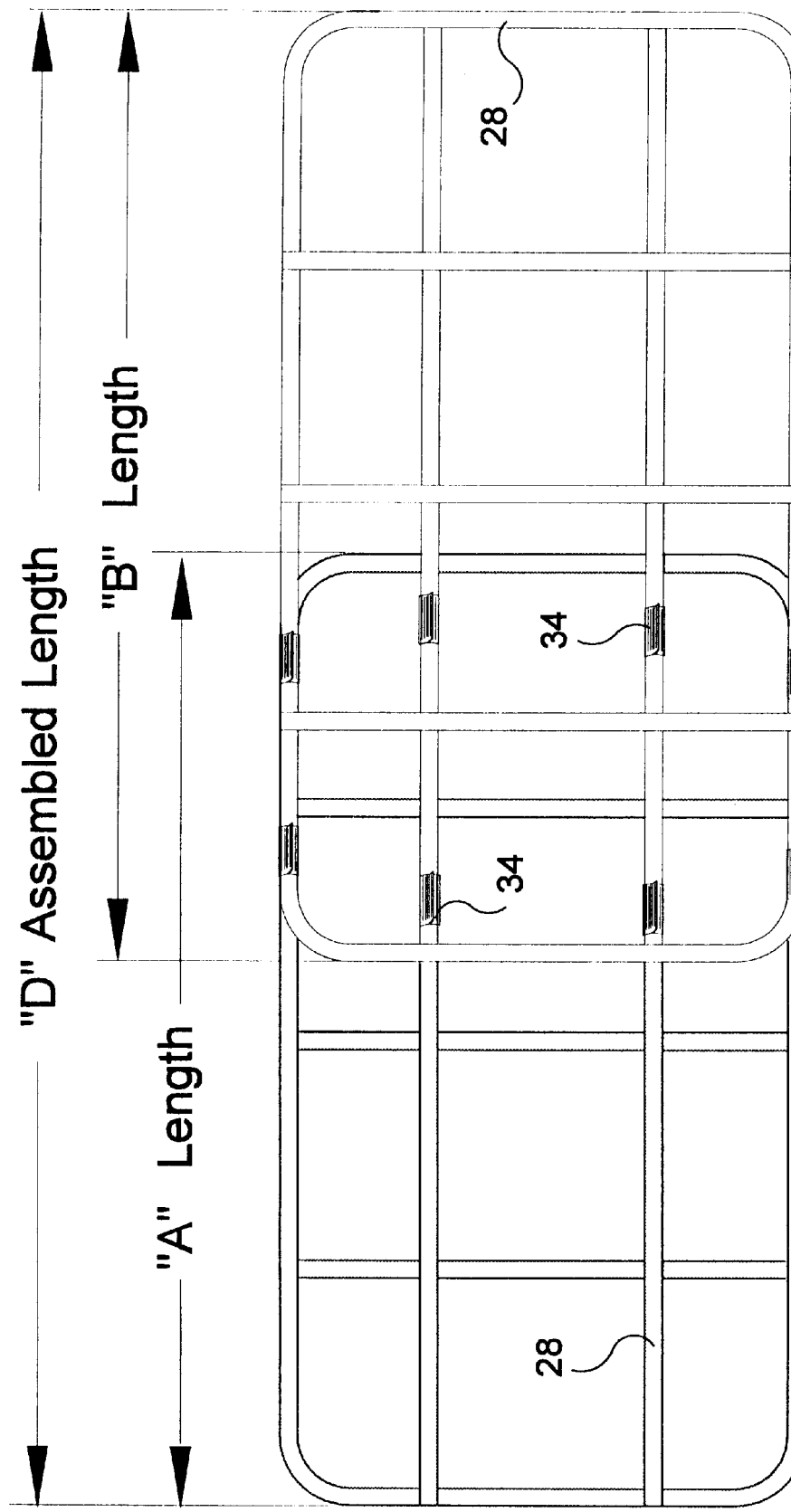
FIG. 7A is another diagrammatic illustration showing the same two prefabricated rigid wire members, as shown in FIG. 7, having been transported to a job site, are selected as the appropriate vertical size and are positioned to the appropriate horizontal size before being secured to one another by means of a special adhesive tape. Whereupon the filter media will be affixed to said frame by means of a plurality of epoxy coated staples. "D" length is accomplished by the assembly of rigid frame member "A" to rigid frame member "B".

Turning to FIG. 7A, therein is shown another diagrammatic illustration showing the same two prefabricated rigid wire members 28, as shown in FIG. 7, having been transported to a job site, are selected as the appropriate vertical size and are positioned to the appropriate horizontal size to be fit into the housing 20 (not shown) before being secured to one another by means of a special adhesive tape 34. Whereupon the filter media 18 (not shown) will be affixed to said frame 28 by means of a plurality of epoxy coated staples (not shown) as shown in FIG. 6. "D" length is accomplished by the appropriate assembly of rigid frame member "A" to rigid frame member "B". Also note that the wire frame member 28 may also be sized so that it also fits into the housing channels 30.

What is claimed is:

1. An apparatus for air conditioning filter, comprising:
   a) a filter media;
   b) a housing within which said filter media is placed;
   c) wire mesh positioned on one side of said filter media;
   d) a frame comprising frame members upon which said filter media and said wire mesh are attached;
   e) first means for attaching said wire mesh to said filter media;
   f) means for fastening said filter media to said frame whereby an air conditioning filter is provided for an air conditioner; and
   g) said means for fastening said filter media to said frame further comprising pleats of said filter media drawn around said frame members and secured to each other by said means for fastening.

2. The apparatus of claim 1, said filter media further comprising a pleated area and a non-pleated area.

3. The apparatus of claim 1, said housing further comprising channels within which said filter media is placed.

4. The apparatus of claim 1, wherein said wire mesh is positioned on the rear side of said filter media.

5. The apparatus of claim 1, said frame further comprises metal.

6. The apparatus of claim 1, said frame further comprises plastic.

7. The apparatus of claim 1, said plurality of frame members further comprises means for fastening said frame members to each other.

8. The apparatus of claim 7, said means for fastening further comprises adhesive tape for fastening said frame members to each other.

9. The apparatus of claim 1, said means for fastening further comprises staples.

10. The apparatus of claim 9, wherein said staples are epoxy coated whereby said staples resist rusting.

11. The apparatus of claim 1, said filter media further comprising a skirt extending beyond said wire mesh on the top edge and bottom edge of said filter media, said housing further comprising channels, said skirt of said filter media being slidably positioned in said channels.

12. The apparatus of claim 1, said first means for attaching said wire mesh to said filter media further comprises bonding.

13. The apparatus of claim 1, said filter media further comprises natural and synthetic fibers.

14. The apparatus of claim 11, said frame being slidably positioned in said channels.

* * * * *